E. A. HALBLEIB.
ELECTRIC MOTOR OR GENERATOR.
APPLICATION FILED AUG. 7, 1915.

1,238,666.

Patented Aug. 28, 1917.

Inventor
Edward A. Halbleib
by his attorneys
Davis & Worse

UNITED STATES PATENT OFFICE.

EDWARD A. HALBLEIB, OF ROCHESTER, NEW YORK, ASSIGNOR TO NORTH EAST ELECTRIC COMPANY, OF ROCHESTER, NEW YORK, A CORPORATION OF NEW YORK.

ELECTRIC MOTOR OR GENERATOR.

1,238,666.   Specification of Letters Patent.   Patented Aug. 28, 1917.

Application filed August 7, 1915.   Serial No. 44,296.

*To all whom it may concern:*

Be it known that I, EDWARD A. HALBLEIB, a citizen of the United States, and resident of Rochester, in the county of Monroe and State of New York, have invented certain new and useful Improvements in Electric Motors or Generators, of which the following is a specification.

This invention relates particularly to electric motors or generators of the inclosed type, and the general object of the invention is to provide simple and convenient means for inclosing certain parts of a motor or generator, particularly the commutator and brushes, and also the electric controlling instruments by which the operation of the motor or generator is regulated.

More specifically, one object of the invention is to produce a compact structure in which the electric controlling instruments are located, in a space otherwise unoccupied, adjacent the commutator, and to provide a removable cover having members separately inclosing the spaces occupied, respectively, by the brushes and by the controlling instruments, so that access may be had to either of these spaces.

A further object of the invention is to provide for effectively sealing in place the cover-member which incloses the instruments, while leaving the member which normally covers the brushes free to be removed by the user when adjustment or other attention to the brushes or commutator is necessary.

A further object of the invention is to provide novel and simple means for retaining, normally, against movement, the means by which the armature-shaft bearing adjacent the commutator is adjusted axially to take up end-play in the armature.

To the foregoing ends the invention consists in the construction and arrangement of parts hereinafter described and illustrated in the accompanying drawings, as defined in the appended claims.

In the accompanying drawings:—

Figure 1:
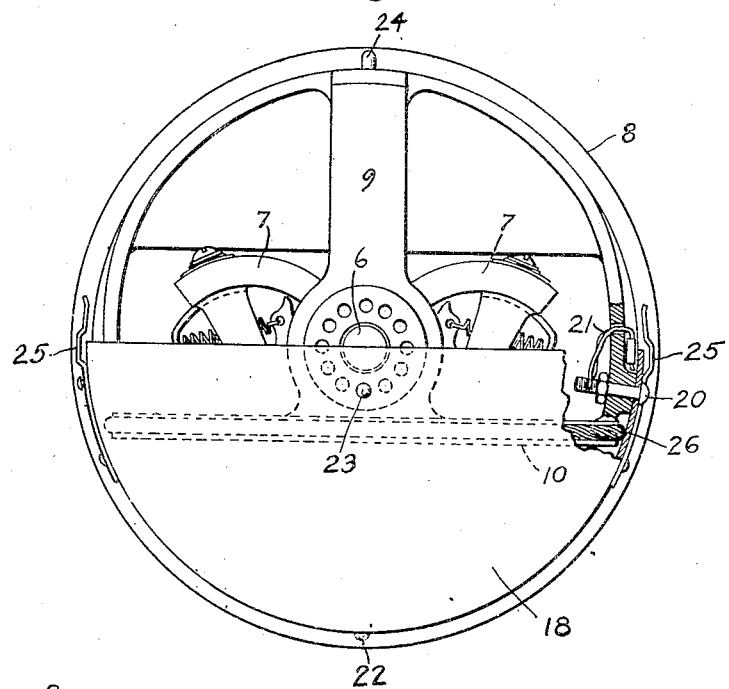
Figure 2:
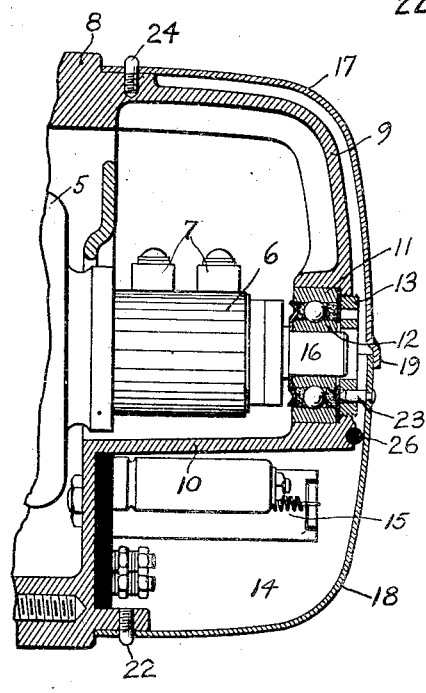

Figure 1 is an end-elevation of an electric motor or generator embodying the present invention, with one of the cover-members removed and certain parts shown in section; and Fig. 2 is a side-elevation, partly in vertical axial section, of the end of the machine shown in Fig. 1.

The invention is illustrated as embodied in an electric motor or generator of a well-known inclosed type, and the armature 5, commutator 6 and brushes 7, as simply illustrated, require no particular description, as they may be of any ordinary or suitable form.

The frame of the machine includes an annular member 8, which is suitably associated with, or attached to, the field-magnet (not shown), and from this member two integral frame-members 9 and 10 project toward the end of the machine, for the particular purpose of supporting the bearing in which the end of the armature-shaft turns. This bearing is shown as a ball-bearing of a well-known form, having outer and inner races 11 and 12, respectively. The outer race fits freely in a cylindrical recess in the frame, while the inner race receives the end of the armature-shaft 16. The position of the bearing is adjusted by a ring 13 which is screwed into a threaded opening in the frame. By rotating this ring the ball-race 11 may be moved axially, so that end-play of the armature may be taken up or adjusted.

The frame-member 10 is in the form of a wide and thin horizontal partition, which divides into two parts the space alongside the commutator. The upper part of this space is occupied by the brushes 7 and the means for supporting and adjusting them, while the lower part 14 of the space is occupied by the electric controlling instruments 15. These instruments need not be particularly described as they may be of various forms. In the case of an electric generator they are, or may be, of any well-known form suitable for regulating the output of the generator, and may be connected with the generator-circuits in accordance with their character. Such connections are not shown in the drawings, as they are not material to the present invention.

The upper frame-member 9 acts as a brace to prevent vertical movement of the shaft-bearing, while the lower frame-member 10, by reason of its laterally extended form, supports the bearing rigidly against lateral movement.

The space occupied by the brushes, the commutator, the armature-shaft bearing and the controlling instruments is all inclosed normally by a removable cover of an approximately hemispherical form. This cover, which may be made of thin stamped sheet-metal, is divided into two members on an approximately diametral line. The lower margin of the upper member is offset so as to form a flange 19 which overhangs the upper edge of the lower member, as shown in Fig. 2, thus making a joint which will effectively shed moisture or exclude dust.

It is desirable that the upper cover-member 17 be readily removable, so that the user of the machine may have access to the brushes and commutator for cleaning and adjustment, while, on the other hand, it is desirable that access to the controlling instruments by the user be prevented, as the adjustment of these instruments should not be tampered with except by the manufacturer or other skilled person. The means for securing these cover-members in place are arranged accordingly. At one lateral extremity of the lower cover-member its peripheral or rear margin is secured to the frame of the machine by means of a bolt 20, which passes through a web forming a part of the frame, as shown in Fig. 1. This bolt is perforated to receive a sealing-wire, which passes out through a perforation in the frame and is secured by a seal. It is thus impossible to remove the bolt without breaking the seal.

To prevent outward movement of the bottom of the cover-member 18 a dowel 22 projects downwardly from the part of the frame-ring 8 on which the cover is seated, this dowel being received loosely in a perforation in the cover. To prevent downward movement of the cover, by which it might otherwise be disengaged from the dowel 22 when the bolt 20 is in place, a stud 23 is fixed to the cover-member 18, at the middle and near the upper margin thereof, and this stud coöperates with one of an annular series of perforations in the adjusting ring 13. In doing so it not only serves to retain the cover in place, but it also performs the additional function of a retainer by which rotation of the ring 13 is normally prevented, and thus the adjustment of this ring and of the bearing is maintained while the cover is in place.

It will be apparent that so long as the seal and the bolt 20 are in place the cover-member 18 cannot be removed, since the bolt prevents it from swinging outwardly in the manner required to disengage the stud 23 from the ring 13, while the stud 23 prevents it from being swung downwardly in the manner required to disengage it from the dowel 22. Without breaking the seal, therefore, it is impossible to remove this cover-member, and it is also impossible for the user to tamper with the adjustment of the ring 13.

In order to protect the controlling instruments effectively against moisture and dust, the frame-member 10 is grooved at its outer edge, and a packing-strip 26 is seated in the groove in a position to engage the inner surface of the cover-member 18.

The upper cover-member 17 is retained at the top by a dowel 24, while its lateral extremities are engaged by two spring-clips 25, which are fixed, at their lower ends, to the lower cover-member. These clips snap over the flange 19 on the upper cover-member, and thus normally retain this member in place, but it may be readily released by springing the clips outwardly and may then be removed upwardly from engagement with the dowel 24.

I claim:—

1. In an electric motor or generator, the combination, with the armature, armature-shaft, commutator, and the bearing for the end of the armature-shaft adjacent the commutator, of a frame-member supporting said bearing; brushes and electric controlling instruments mounted on said frame-member alongside the commutator; and a cover, for inclosing the brushes and instruments, comprising two members removably attached to the frame-member; one member of the cover being removable independently of the other, to afford access to the brushes without uncovering the instruments.

2. In an electric motor or generator, the combination, with the frame of the machine, of a substantially hemispherical end-cover divided into two members on an approximately diametral line; means for securing one cover-member to the frame; means, located at the middle of the peripheral edge of the second cover-member, for preventing outward movement from the frame; and means for securing the lateral extremities of the second member detachably to the first member.

3. In an electric motor or generator, the combination, with the commutator, of a partition extending alongside the commutator and dividing the space adjacent the commutator into two parts; brushes mounted in one part of said space and coöperating with the commutator; electric controlling instruments mounted in the other part of said space; and two separate cover-members for closing the two respective parts of said space.

4. In an electric motor or generator, the combination, with the commutator, the armature-shaft, and a bearing for the end of the shaft adjacent the commutator, of a frame, by which said bearing is supported, comprising a member located alongside the commutator and extending laterally across the end of the machine, and a brace integral with said member and located on the opposite side of the commutator; brushes mounted at one side of said member and coöperating with the commutator; electric controlling instruments mounted at the other side of said member; and a cover for inclosing all the before-mentioned parts.

5. In an electric motor or generator, the combination, with the armature-shaft, a bearing therefor, and a frame supporting the bearing, of rotatable means for adjusting the bearing; a removable cover for closing the end of the frame; and means, on said cover, arranged to engage said rotatable means and normally prevent rotation thereof while the cover is in place.

6. In an electric motor or generator, the combination, with the armature-shaft, a bearing therefor, and a frame supporting the bearing, of rotatable means for adjusting the bearing; a removable cover for closing the end of the frame; and means, for securing the cover in place, including a stud fixed to and projecting from the cover, said stud engaging said rotatable means and acting also to prevent rotation thereof while the cover is in place.

7. In an electric motor or generator, the combination, with the armature-shaft, a bearing therefor, and a frame supporting the bearing, of rotatable means for adjusting the bearing; a cover for closing the end of the frame; and means, for securing the cover normally in place and for also retaining said rotatable means against rotation, comprising a sealable fastening device at one point of the peripheral edge of the cover, a dowel at another point of the peripheral edge of the cover, and a stud fixed to the middle of the cover and engaging said rotatable means.

8. In an electric motor or generator, the combination, with the armature-shaft, a bearing therefor, and a frame supporting the bearing, of rotatable means for adjusting the bearing; a cover for closing the end of the frame; and means, for securing the cover normally in place and for also retaining said rotatable means against rotation, comprising a sealable fastening device at one side of the cover, means for preventing outward movement of the bottom of the cover, and means for preventing downward movement of the cover, the last-mentioned means coöperating with the rotatable bearing-adjusting means to prevent rotation of the latter.

EDWARD A. HALBLEIB.